US012308006B2

(12) United States Patent
Okamoto et al.

(10) Patent No.: US 12,308,006 B2
(45) Date of Patent: May 20, 2025

(54) MUSICAL TONE GENERATING DEVICE AND CONTROL METHOD OF MUSICAL TONE GENERATING DEVICE

(71) Applicant: KABUSHIKI KAISHA KAWAI GAKKI SEISAKUSHO, Hamamatsu (JP)

(72) Inventors: Seiji Okamoto, Hamamatsu (JP); Tetsuya Hirano, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 872 days.

(21) Appl. No.: 17/512,290

(22) Filed: Oct. 27, 2021

(65) Prior Publication Data

US 2022/0130361 A1 Apr. 28, 2022

(30) Foreign Application Priority Data

Oct. 28, 2020 (JP) ................................. 2020-180836

(51) Int. Cl.
*G10H 7/04* (2006.01)
*G10H 1/00* (2006.01)

(52) U.S. Cl.
CPC ............. *G10H 7/04* (2013.01); *G10H 1/0008* (2013.01); *G10H 2230/031* (2013.01); *G10H 2230/041* (2013.01)

(58) Field of Classification Search
CPC .. G10H 7/04; G10H 1/0008; G10H 2230/031; G10H 2230/041; G10H 7/002;
(Continued)

(56) References Cited

U.S. PATENT DOCUMENTS 5,740,177 A * 4/1998 Miyata ................ G06F 11/1008 714/E11.034
8,035,021 B2 10/2011 Shirahama et al.
(Continued)

FOREIGN PATENT DOCUMENTS

JP 2010-224077 A 10/2010
JP 2011-197550 A 10/2011

OTHER PUBLICATIONS

Japanese Office Action for corresponding Japanese Application No. 2020-180836, dated Jul. 30, 2024, with an English translation.

*Primary Examiner* — Dedei K Hammond
*Assistant Examiner* — Philip G Scoles
(74) *Attorney, Agent, or Firm* — Birch, Stewart, Kolasch & Birch, LLP

(57) ABSTRACT

A musical tone generating device includes: a nonvolatile storage device that stores musical tone waveform data; a volatile storage device; and a control means that, when a power supply is turned on, performs control to transfer musical tone waveform data to the volatile storage device from the nonvolatile storage device, in the case where an instruction to reproduce a musical tone is given, the control means to read musical tone waveform data from the volatile storage device, and in the case where an error in the read musical tone waveform data is detected, the control means to perform control to overwrite musical tone waveform data obtained by correcting the musical tone waveform data including the detected error to the volatile storage device or transfer normal musical tone waveform data corresponding to the musical tone waveform data including the detected error to the volatile storage device from the nonvolatile storage device.

15 Claims, 2 Drawing Sheets

(58) Field of Classification Search
CPC ............... G10H 7/02; G10H 2240/185; G10H 2250/615
See application file for complete search history.

(56) References Cited

U.S. PATENT DOCUMENTS

| | | | | |
|---|---|---|---|---|
| 2010/0236384 | A1 * | 9/2010 | Shirahama | G10H 7/04 84/605 |
| 2011/0232460 | A1 * | 9/2011 | Shirahama | G10H 7/045 84/605 |

* cited by examiner

MUSICAL TONE GENERATING DEVICE AND CONTROL METHOD OF MUSICAL TONE GENERATING DEVICE

CROSS-REFERENCE TO RELATED APPLICATIONS

This application is based upon and claims the benefit of priority of the prior Japanese Patent Application No. 2020-180836, filed on Oct. 28, 2020, the entire contents of which are incorporated herein by reference.

BACKGROUND OF THE INVENTION

Field of the Invention

The present invention relates to a musical tone generating device and a control method of the musical tone generating device.

Description of the Related Art

Patent Document 1 describes a tone generation apparatus that stores waveform data in a NAND-type flash memory and then performs reproduction while reading the waveform data from the NAND-type flash memory into a waveform memory via a buffer. With no interrupt to a CPU, the waveform data stored in the NAND-type flash memory are read out on a page-by-page basis to supply the buffer of the waveform memory with sample data. A series of waveform data are stored in successive pages of the NAND-type flash memory that enables high-speed page access. A page number of a page to be read out first is set, and that page is read into the buffer in advance. Before completion of readout of the first page, another page to be read out next is read into the buffer. After that, the page number is incremented by one each time readout of one page is completed, and the sample data of the page number continue to be reproduced while being read into the buffer.

[Patent Document 1] Japanese Laid-open Patent Publication No. 2010-224077

A soft error is an error in which data in a volatile storage device are rewritten by the ionizing effect of cosmic ray particles. An error correcting code (ECC) is a code for correcting data errors. However, if an error with a bit count that is greater than an ECC error correctable bit count occurs, data correction is impossible.

In a musical tone generating device that transfers all the musical tone waveform data to a volatile storage device from a nonvolatile storage device when a power supply is turned on, if an error with a bit count that is greater than the ECC error correctable bit count occurs due to a software error, proper musical tone waveform data cannot be reproduced unless the power supply is restarted and then all the musical tone waveform data are transferred to the volatile storage device from the nonvolatile storage device again.

SUMMARY OF THE INVENTION

An object of the present invention is to enable the reproduction of normal musical tone waveform data without restarting a power supply when a soft error occurs.

A musical tone generating device of the present invention includes: a nonvolatile storage device that stores musical tone waveform data; a volatile storage device; and a control means that, when a power supply is turned on, performs control to transfer musical tone waveform data to the volatile storage device from the nonvolatile storage device, in the case where an instruction to reproduce a musical tone is given, the control means to read musical tone waveform data from the volatile storage device, and in the case where an error in the read musical tone waveform data is detected, the control means to perform control to overwrite musical tone waveform data obtained by correcting the musical tone waveform data including the detected error to the volatile storage device or transfer normal musical tone waveform data corresponding to the musical tone waveform data including the detected error to the volatile storage device from the nonvolatile storage device.

A control method of a musical tone generating device of the present invention is a control method of a musical tone generating device including: a nonvolatile storage device that stores musical tone waveform data; and a volatile storage device, the method including: when a power supply is turned on, performing control to transfer musical tone waveform data to the volatile storage device from the nonvolatile storage device; in the case where an instruction to reproduce a musical tone is given, reading musical tone waveform data from the volatile storage device; and in the case where an error in the read musical tone waveform data is detected, performing control to overwrite musical tone waveform data obtained by correcting the musical tone waveform data including the detected error to the volatile storage device or transfer normal musical tone waveform data corresponding to the musical tone waveform data including the detected error to the volatile storage device from the nonvolatile storage device.

DETAILED DESCRIPTION OF THE PREFERRED EMBODIMENTS

Figure 1:
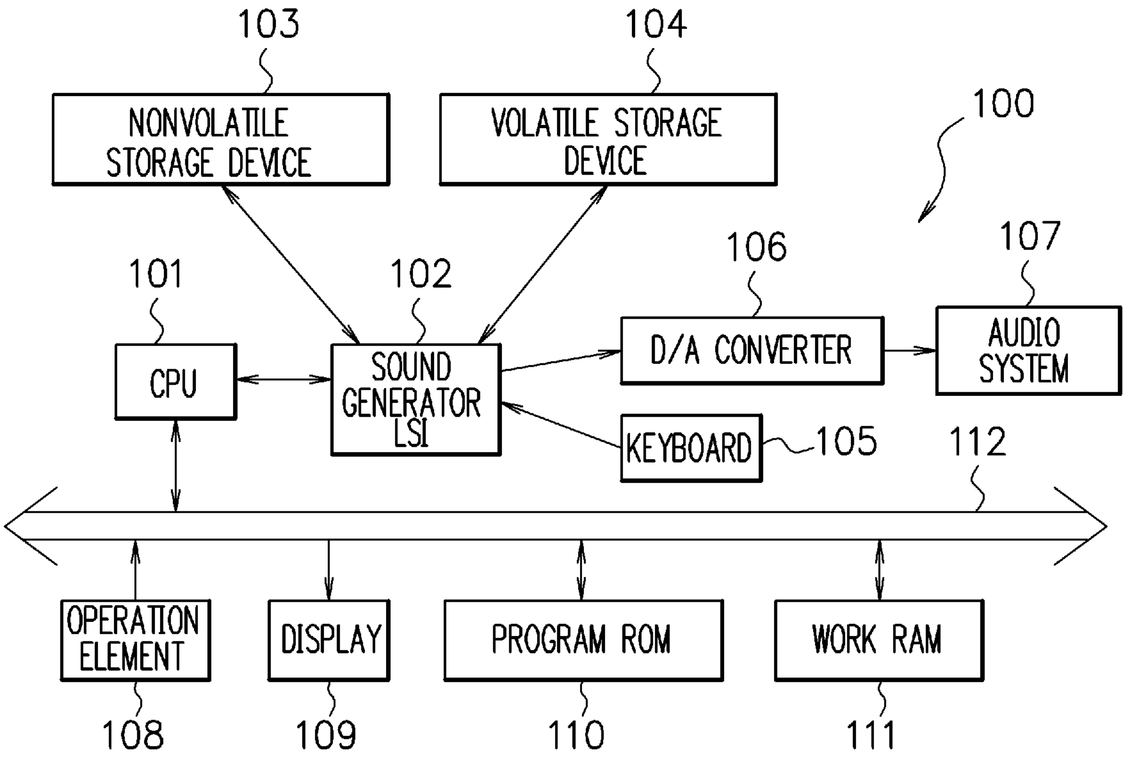
FIG. 1 is a block diagram illustrating a configuration example of a musical tone generating device according to this embodiment.

FIG. 1 is a block diagram illustrating a configuration example of a musical tone generating device 100 according to this embodiment. The musical tone generating device 100 includes a CPU 101, a sound generator LSI 102, a nonvolatile storage device 103, a volatile storage device 104, a keyboard 105, a digital/analog converter 106, an audio system 107, an operation element 108, a display 109, a program ROM 110, a work RAM 111, and a bus 112. The musical tone generating device 100 is, for example, an electronic musical instrument.

The CPU 101 is a central processing unit. The program ROM (read-only memory) 110 stores a program. The work RAM (random access memory) 111 functions as a work region for the CPU 101. The CPU 101 expands the program stored in the program ROM 110 to the work RAM 111 and executes the program expanded in the work RAM 111, to thereby control the sound generator LSI 102. The sound generator LSI 102 is a type of control unit.

The keyboard 105 includes a plurality of white keys and a plurality of black keys, and outputs a note-on message to the sound generator LSI 102 upon a key press operation by a performer. The note-on message is a musical tone reproduction instruction signal and has a note number and a velocity. The note number indicates the pitch of a note. The velocity indicates the intensity of a note based on a key pressing speed.

The operation element 108 includes a power switch, a volume control button, a tone selection button, and so on. The display 109 displays setting parameters of the musical tone generating device 100, and so on.

The nonvolatile storage device 103 is, for example, a flash memory such as an eMMC (embedded Multi Media Card). The nonvolatile storage device 103 stores musical tone waveform data and an error correcting code (hereinafter to be referred to as ECC) corresponding to the musical tone waveform data. For every 64-bit (1-word) musical tone waveform data, an 8-bit ECC is provided. The 8-bit ECC can correct errors that are equal to or less than an error correctable bit count for the 64-bit musical tone waveform data. The error correctable bit count is, for example, one bit.

Incidentally, the nonvolatile storage device 103 may store only the musical tone waveform data, and the sound generator LSI 102 may generate the ECC based on the musical tone waveform data stored in the nonvolatile storage device 103.

The volatile storage device 104 is, for example, a DDR SDRAM (synchronous dynamic random access memory), which is a type of DRAM (dynamic random access memory). Incidentally, the volatile storage device 104 may be a SRAM (static random access memory). The sound generator LSI 102 is capable of burst transferring musical tone waveform data with a word count that is a burst length of two or more and an ECC to the volatile storage device 104. That is, the sound generator LSI 102 continuously and rapidly transfers musical tone waveform data with a word count that is a burst length and an ECC to the volatile storage device 104 based on one piece of address information. The burst length is, for example, 4 words or 8 words.

When the power is turned on by turning on the power switch of the operation element 108, the sound generator LSI 102 performs control to transfer the musical tone waveform data and the ECC to the volatile storage device 104 from the nonvolatile storage device 103.

When receiving the note-on message from the keyboard 105, the sound generator LSI 102 reads the musical tone waveform data and the ECC from the volatile storage device 104. Then, based on the ECC, the sound generator LSI 102 detects whether or not there is an error in the musical tone waveform data. When there is an error in the musical tone waveform data, the sound generator LSI 102 corrects the musical tone waveform data including the detected error based on the ECC and outputs the corrected musical tone waveform data to the digital/analog converter 106. Further, when there is no error in the musical tone waveform data, the sound generator LSI 102 outputs the read musical tone waveform data to the digital/analog converter 106.

The digital/analog converter 106 converts the digital musical tone waveform data input from the sound generator LSI 102 into an analog musical tone waveform signal, and outputs the analog musical tone waveform signal to the audio system 107.

The audio system 107 includes an amplifier and a speaker, in which the amplifier amplifies the analog musical tone waveform signal and the speaker pronounces the amplified musical tone waveform signal.

Figure 2:
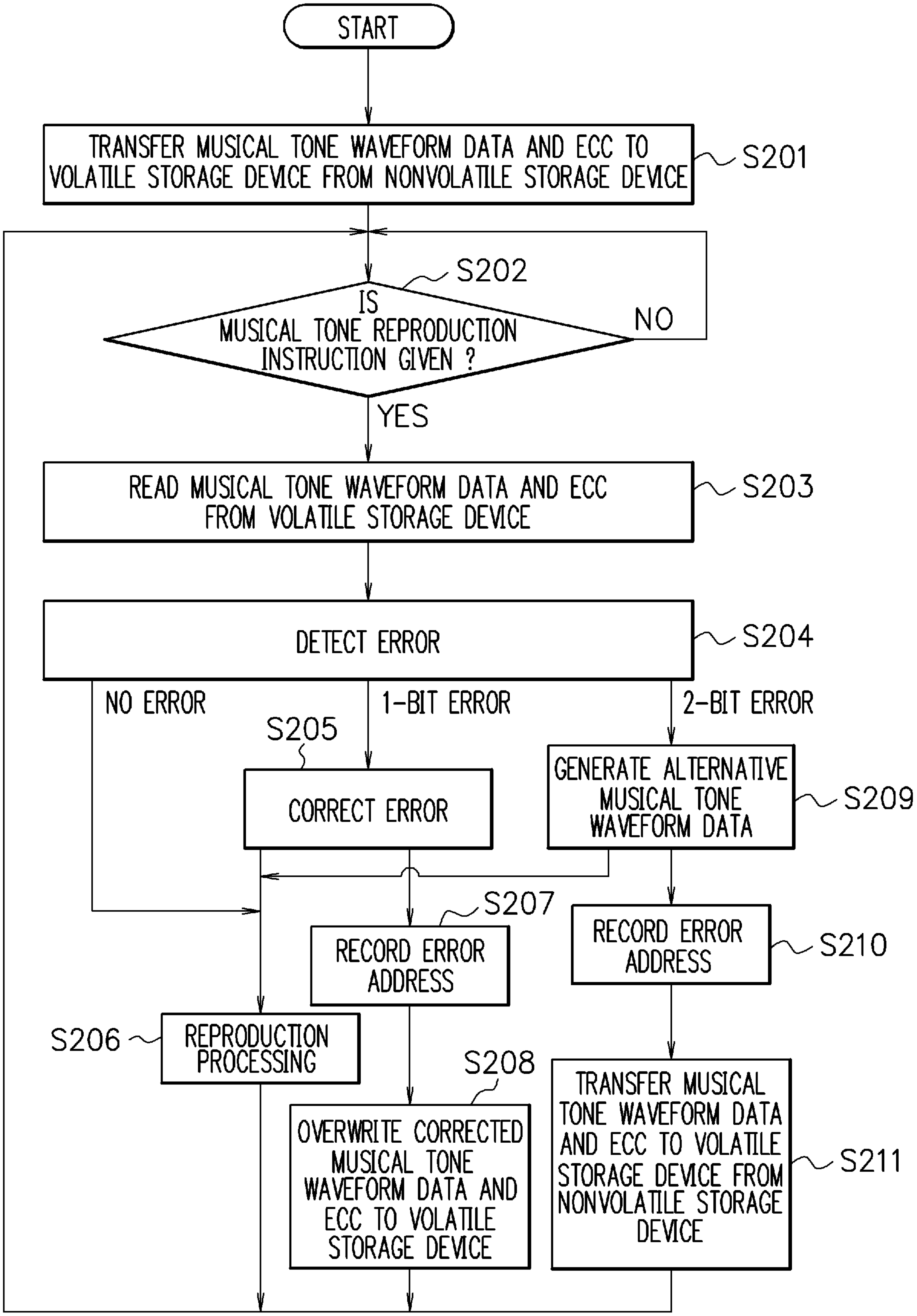
FIG. 2 is a flowchart illustrating a control method of the musical tone generating device according to this embodiment.

FIG. 2 is a flowchart illustrating a control method of the musical tone generating device 100. At Step S201, the sound generator LSI 102 performs control to transfer the musical tone waveform data and the ECC corresponding to the musical tone waveform data to the volatile storage device 104 from the nonvolatile storage device 103 when the power is turned on by turning on the power switch of the operation element 108. The volatile storage device 104 stores the musical tone waveform data and the ECC.

Incidentally, when the nonvolatile storage device 103 stores only the musical tone waveform data, the sound generator LSI 102 generates an ECC corresponding to the musical tone waveform data based on the musical tone waveform data stored in the nonvolatile storage device 103, and writes the musical tone waveform data and the ECC corresponding to the musical tone waveform data to the volatile storage device 104.

Then, at Step S202, the sound generator LSI 102 determines whether or not a musical tone reproduction instruction based on a key press operation of the keyboard 105 has been given. The sound generator LSI 102 waits until the musical tone reproduction instruction is given, and when the musical tone reproduction instruction is given, the sound generator LSI 102 proceeds to Step S203.

Then, at Step S203, the sound generator LSI 102 reads the musical tone waveform data and the ECC corresponding to the musical tone waveform data from the volatile storage device 104.

Then, at Step S204, the sound generator LSI 102 detects whether or not there is an error in the read musical tone waveform data using the read ECC. In the musical tone waveform data stored in the volatile storage device 104, a soft error may occur. For example, the sound generator LSI 102 can detect whether or not there is an error of two bits or less in 64-bit musical tone waveform data using an 8-bit ECC. When there is a 1-bit error in the musical tone waveform data, the sound generator LSI 102 can correct the 1-bit error in the 64-bit musical tone waveform data using the 8-bit ECC. When there is a 2-bit error in the musical tone waveform data, the sound generator LSI 102 cannot correct the 1-bit error in the 64-bit musical tone waveform data using the 8-bit ECC.

When there is no error in the read musical tone waveform data, the sound generator LSI 102 proceeds to Step S206. At Step S206, the sound generator LSI 102 performs reproduction processing of the read musical tone waveform data. Specifically, the sound generator LSI 102 outputs the read musical tone waveform data to the digital/analog converter 106. The digital/analog converter 106 converts the digital musical tone waveform data input from the sound generator LSI 102 into an analog musical tone waveform signal, and outputs the analog musical tone waveform signal to the audio system 107. The audio system 107 causes the amplifier to amplify the analog musical tone waveform signal, and causes the speaker to pronounce the amplified musical tone waveform signal. Thereafter, the sound generator LSI 102 returns to Step S202.

Further, when the read musical tone waveform data include an error with a bit count that is equal to or less than the error correctable bit count (one bit) at Step S204, the sound generator LSI 102 proceeds to Step S205. Further, the sound generator LSI 102 proceeds to Step S209 when the read musical tone waveform data include an error with a bit count that is greater than the error correctable bit count (one bit).

At step S205, the sound generator LSI 102 corrects the musical tone waveform data including the error by using the read ECC, and proceeds to Step S206 and Step S207.

At Step S206, the reproduction processing of the corrected musical tone waveform data is performed. Specifically, the sound generator LSI 102 outputs the corrected musical tone waveform data to the digital/analog converter 106. The digital/analog converter 106 converts the digital musical tone waveform data input from the sound generator LSI 102 into an analog musical tone waveform signal, and outputs the analog musical tone waveform signal to the audio system 107. The audio system 107 causes the amplifier to amplify the analog musical tone waveform signal, and causes the speaker to pronounce the amplified musical tone waveform signal. Thereafter, the sound generator LSI 102 returns to Step S202.

At Step S207, the sound generator LSI 102 records an address of the musical tone waveform data including the detected error on the volatile storage device 104, and proceeds to Step S208.

At Step S208, based on the recorded address on the volatile storage device 104, the sound generator LSI 102 overwrites the above-described corrected musical tone waveform data and the ECC corresponding to the musical tone waveform data to the volatile storage device 104, and returns to Step S202.

If the sound generator LSI 102 does not perform the processing at Step S207 or the processing at Step S208, the 64-bit musical tone waveform data stored in the volatile storage device 104 will not be corrected, and thus the 1-bit error remains as it is. If left uncorrected, errors of other bits may occur in the same 64-bit musical tone waveform data, resulting in that errors of two bits in total may occur. In that case, the sound generator LSI 102 will be no longer able to correct the musical tone waveform data, and generation of fatal noise may be caused.

Then, in order to prevent the accumulation of bit errors in the same 64-bit musical tone waveform data, when detecting a 1-bit error, the sound generator LSI 102 records the address where the error has occurred at Step S207, and at Step S208, the sound generator LSI 102 corrects the error in the musical tone waveform data and overwrites the corrected musical tone waveform data to the volatile storage device 104. Incidentally, the reason why the sound generator LSI 102 records the address of the error at Step S207 is to avoid the situation where when the sound generator LSI 102 detects an error one after another, the processing is not performed properly by temporarily storing and accumulating the addresses of those errors, and then overwriting the corrected musical tone waveform data based on those addresses in sequence.

At Step S209, the sound generator LSI 102 generates alternative musical tone waveform data, and proceeds to Steps S206 and Step S210. The alternative musical tone waveform data can be generated by the following first to fourth methods, for example. In the first method, the sound generator LSI 102 generates the musical tone waveform data including the 2-bit error read at Step S203 as the alternative musical tone waveform data as they are. In the second method, the sound generator LSI 102 generates the musical tone waveform data that were subjected to the reproduction processing at the previous Step S206 as the alternative musical tone waveform data for this time. In the third method, the sound generator LSI 102 generates interpolation data between the musical tone waveform data that were subjected to the reproduction processing at the previous Step S206 and the musical tone waveform data that are scheduled to be subjected to the reproduction processing at the next Step S206 as the alternative musical tone waveform data for this time. In the fourth method, the sound generator LSI 102 generates musical tone waveform data that are predicted and calculated based on a plurality of pieces of musical tone waveform data that were subjected to the reproduction processing at the previous Step S206 as the alternative musical tone waveform data for this time.

At Step S206, the reproduction processing of the alternative musical tone waveform data is performed. Specifically, the sound generator LSI 102 outputs the alternative musical tone waveform data to the digital/analog converter 106. The digital/analog converter 106 converts the digital musical tone waveform data input from the sound generator LSI 102 into an analog musical tone waveform signal, and outputs the analog musical tone waveform signal to the audio system 107. The audio system 107 causes the amplifier to amplify the analog musical tone waveform signal, and causes the speaker to pronounce the amplified musical tone waveform signal. Thereafter, the sound generator LSI 102 returns to Step S202.

At Step S210, the sound generator LSI 102 records an address of the musical tone waveform data including the detected error on the volatile storage device 104, and proceeds to Step S211.

At Step S211, based on the recorded address on the volatile storage device 104, the sound generator LSI 102 performs control to transfer normal musical tone waveform data corresponding to the musical tone waveform data including the detected error and an ECC corresponding to the musical tone waveform data to the volatile storage device 104 from the nonvolatile storage device 103, and returns to Step S202. The volatile storage device 104 stores the musical tone waveform data including no error and the ECC.

Incidentally, when the nonvolatile storage device 103 stores only the musical tone waveform data, the sound generator LSI 102 generates an ECC based on the musical tone waveform data stored in the nonvolatile storage device 103, and writes the musical tone waveform data and the ECC to the volatile storage device 104.

When the nonvolatile storage device 103 or the volatile storage device 104 is a type of device that performs burst transfer in units of a plurality of words, it is difficult to transfer only the normal 1-word musical tone waveform data corresponding to the 1-word musical tone waveform data including the error to the volatile storage device 104 from the nonvolatile storage device 103.

Thus, at Step S211, the sound generator LSI 102 performs control to transfer the normal musical tone waveform data corresponding to the musical tone waveform data including the error to the volatile storage device 104 from the nonvolatile storage device 103 in units of word count that is the least common multiple of the minimum transfer word count of the nonvolatile storage device 103 and the minimum transfer word count of the volatile storage device 104. For example, when the nonvolatile storage device 103 outputs in units of 3 words and the volatile storage device 104 inputs in units of 2 words, the least common multiple of the 3 words and the 2 words is 6 words. The sound generator LSI 102 performs control to transfer the normal musical tone waveform data to the volatile storage device 104 from the nonvolatile storage device 103 in units of 6 words.

At Step S201, when the power supply is turned on, the sound generator LSI 102 performs control to transfer the musical tone waveform data and the ECC to the volatile storage device 104 from the nonvolatile storage device 103 in units of first word count, which is relatively large, in order to transfer a large amount of musical tone waveform data quickly. In contrast to this, at Step S211, the sound generator LSI 102 performs control to transfer the normal musical tone waveform data to the volatile storage device 104 from the nonvolatile storage device 103 in units of second word count, which is smaller than the first word count, in order to transfer a small amount of musical tone waveform data at high speed.

Incidentally, at Step S211, the sound generator LSI 102 may perform control to transfer the normal musical tone waveform data to the volatile storage device 104 from the nonvolatile storage device 103 in units of the first word count. At Step S201 and Step S211, the sound generator LSI 102 transfers the data in units of the same first word count, and thereby the transfer method can be unified, the transfer control can be simplified, and the cost can be reduced.

Further, at Step S208, the sound generator LSI 102 may perform the same processing as at Step S211.

Further, the sound generator LSI 102 performs the processing at Step S208 and the processing at Step S211 at a timing that does not interfere with the reproduction processing at Step S206. This enables real-time reproduction processing.

As above, in the musical tone waveform data stored in the volatile storage device 104, a soft error may occur. When a 1-bit error is detected in the musical tone waveform data stored in the volatile storage device 104, the sound generator LSI 102 corrects the musical tone waveform data and overwrites the corrected musical tone waveform data to the volatile storage device 104, and thus musical tone reproduction is always performed correctly. In addition, when a 2-bit error is detected in the musical tone waveform data stored in the volatile storage device 104, the sound generator LSI 102 cannot correct the error, but performs control to transfer the musical tone waveform data including the error to the volatile storage device 104 from the nonvolatile storage device 103 without restarting the power supply, and thus can perform the musical tone reproduction processing normally thereafter.

According to the present embodiment, when a soft error occurs, normal musical tone waveform data can be reproduced without restarting a power supply.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A musical tone generating device, comprising:
- a nonvolatile storage device that stores musical tone waveform data;
- a volatile storage device; and
- a control means configured to,
  - when a power supply is turned on, performs control to transfer the musical tone waveform data to the volatile storage device from the nonvolatile storage device,
  - in a case where an instruction to reproduce a musical tone is given, the control means is further configured to read musical tone waveform data from the volatile storage device,
  - determining whether there is an error detected in read musical tone waveform data;
  - when the error is detected, determining whether the error can be corrected; and
  - in a case where the error in the read musical tone waveform data is detected, and the error can be corrected, the control means is further configured to correct the musical tone waveform data including the error that has been detected, and to perform control to overwrite musical tone waveform data with the musical tone waveform data that has been corrected to the volatile storage device, and
  - when the error cannot be corrected, transfer normal musical tone waveform data corresponding to the musical tone waveform data including the error that has been detected to the volatile storage device from the nonvolatile storage device.

2. The musical tone generating device according to claim 1, wherein
- the nonvolatile storage device stores the musical tone waveform data and an error correcting code corresponding to the musical tone waveform data, and
- the control means, when the power supply is turned on, performs control to transfer the musical tone waveform data and the error correcting code corresponding to the musical tone waveform data to the volatile storage device from the nonvolatile storage device, in the case where an instruction to reproduce a musical tone is given, the control means detects whether or not there is an error in the read musical tone waveform data by using the error correcting code, and in the case where there is an error in the read musical tone waveform data, the control means corrects the musical tone waveform data including the error by using the error correcting code.

3. The musical tone generating device according to claim 1, wherein
- the control means, when the power supply is turned on, generates, based on the musical tone waveform data stored in the nonvolatile storage device, an error correcting code corresponding to the musical tone waveform data and writes the musical tone waveform data and the error correcting code corresponding to the musical tone waveform data to the volatile storage device, in the case where an instruction to reproduce a musical tone is given, the control means detects whether or not there is an error in the read musical tone waveform data by using the error correcting code, and in the case where there is an error in the read musical tone waveform data, the control means corrects the musical tone waveform data including the error by using the error correcting code.

4. The musical tone generating device according to claim 2, wherein
- in the case where there is an error with a bit count that is equal to or less than an error correctable bit count in the read musical tone waveform data, the control means overwrites musical tone waveform data obtained by correcting the musical tone waveform data including the error to the volatile storage device, and in the case where there is an error with a bit count that is greater than the error correctable bit count in the read musical tone waveform data, the control means performs control to transfer normal musical tone waveform data corresponding to the musical tone waveform data including the error to the volatile storage device from the nonvolatile storage device.

5. The musical tone generating device according to claim 4, wherein
- in the case where there is an error with a bit count that is equal to or less than the error correctable bit count in the read musical tone waveform data, the control means performs reproduction processing of musical tone waveform data obtained by correcting the musical tone waveform data including the error, and in the case where there is no error in the read musical tone waveform data, the control means performs reproduction processing of the read musical tone waveform data.

6. The musical tone generating device according to claim 4, wherein in the case where there is an error with a bit count that is greater than the error correctable bit count in the read musical tone waveform data, the control means performs control to transfer the normal musical tone waveform data corresponding to the musical tone waveform data including the error to the volatile storage device from the nonvolatile storage device in units of word count that is a least common multiple of a minimum transfer word count of the nonvolatile storage device and a minimum transfer word count of the volatile storage device.

7. The musical tone generating device according to claim 4, wherein when the power supply is turned on, the control means performs control to transfer the musical tone waveform data to the volatile storage device from the nonvolatile storage device in units of first word count, and in the case where there is an error with a bit count that is greater than the error correctable bit count in the read musical tone waveform data, the control means performs control to transfer the normal musical tone waveform data to the volatile storage device from the nonvolatile storage device in units of second word count, which is smaller than the first word count.

8. The musical tone generating device according to claim 4, wherein when the power supply is turned on, the control means performs control to transfer the musical tone waveform data to the volatile storage device from the nonvolatile storage device in units of first word count, and in the case where there is an error with a bit count that is greater than the error correctable bit count in the read musical tone waveform data, the control means performs control to transfer the normal musical tone waveform data to the volatile storage device from the nonvolatile storage device in units of the first word count.

9. The musical tone generating device according to claim 3, wherein in the case where there is an error with a bit count that is equal to or less than an error correctable bit count in the read musical tone waveform data, the control means overwrites musical tone waveform data obtained by correcting the musical tone waveform data including the error to the volatile storage device, and in the case where there is an error with a bit count that is greater than the error correctable bit count in the read musical tone waveform data, the control means performs control to transfer normal musical tone waveform data corresponding to the musical tone waveform data including the error to the volatile storage device from the nonvolatile storage device.

10. The musical tone generating device according to claim 9, wherein in the case where there is an error with a bit count that is equal to or less than the error correctable bit count in the read musical tone waveform data, the control means performs reproduction processing of musical tone waveform data obtained by correcting the musical tone waveform data including the error, and in the case where there is no error in the read musical tone waveform data, the control means performs reproduction processing of the read musical tone waveform data.

11. The musical tone generating device according to claim 9, wherein in the case where there is an error with a bit count that is greater than the error correctable bit count in the read musical tone waveform data, the control means performs control to transfer the normal musical tone waveform data corresponding to the musical tone waveform data including the error to the volatile storage device from the nonvolatile storage device in units of word count that is a least common multiple of a minimum transfer word count of the nonvolatile storage device and a minimum transfer word count of the volatile storage device.

12. The musical tone generating device according to claim 9, wherein when the power supply is turned on, the control means performs control to transfer the musical tone waveform data to the volatile storage device from the nonvolatile storage device in units of first word count, and in the case where there is an error with a bit count that is greater than the error correctable bit count in the read musical tone waveform data, the control means performs control to transfer the normal musical tone waveform data to the volatile storage device from the nonvolatile storage device in units of second word count, which is smaller than the first word count.

13. The musical tone generating device according to claim 9, wherein when the power supply is turned on, the control means performs control to transfer the musical tone waveform data to the volatile storage device from the nonvolatile storage device in units of first word count, and in the case where there is an error with a bit count that is greater than the error correctable bit count in the read musical tone waveform data, the control means performs control to transfer the normal musical tone waveform data to the volatile storage device from the nonvolatile storage device in units of the first word count.

14. The musical tone generating device according to claim 1, wherein in the case where an error in the read musical tone waveform data is detected, the control means records an address of the musical tone waveform data including the error that has been detected and performs control to overwrite musical tone waveform data obtained by correcting the musical tone waveform data including the detected error to the volatile storage device or transfer normal musical tone waveform data corresponding to the musical tone waveform data including the detected error to the volatile storage device from the nonvolatile storage device.

15. A control method of a musical tone generating device including: a nonvolatile storage device that stores musical tone waveform data; and a volatile storage device, the method comprising:

when a power supply is turned on, performing control to transfer musical tone waveform data to the volatile storage device from the nonvolatile storage device;

in a case where an instruction to reproduce a musical tone is given, reading musical tone waveform data from the volatile storage device;

determining whether there is an error detected in read musical tone waveform data;

when the error is detected, determining whether the error can be corrected; and in a case where the error in the read musical tone waveform data is detected, and the error can be corrected, correcting the musical tone waveform data including the error that has been detected, and performing control to overwrite musical tone waveform data with the musical tone waveform data that has been corrected to the volatile storage device, and when the error cannot be corrected, transfer normal musical tone waveform data corresponding to the musical tone waveform data including the error that has been detected to the volatile storage device from the non-volatile storage device.

* * * * *